May 8, 1951   C. L. DIMMER   2,551,932
INVESTMENT MATERIAL
Filed April 27, 1949   2 Sheets-Sheet 1
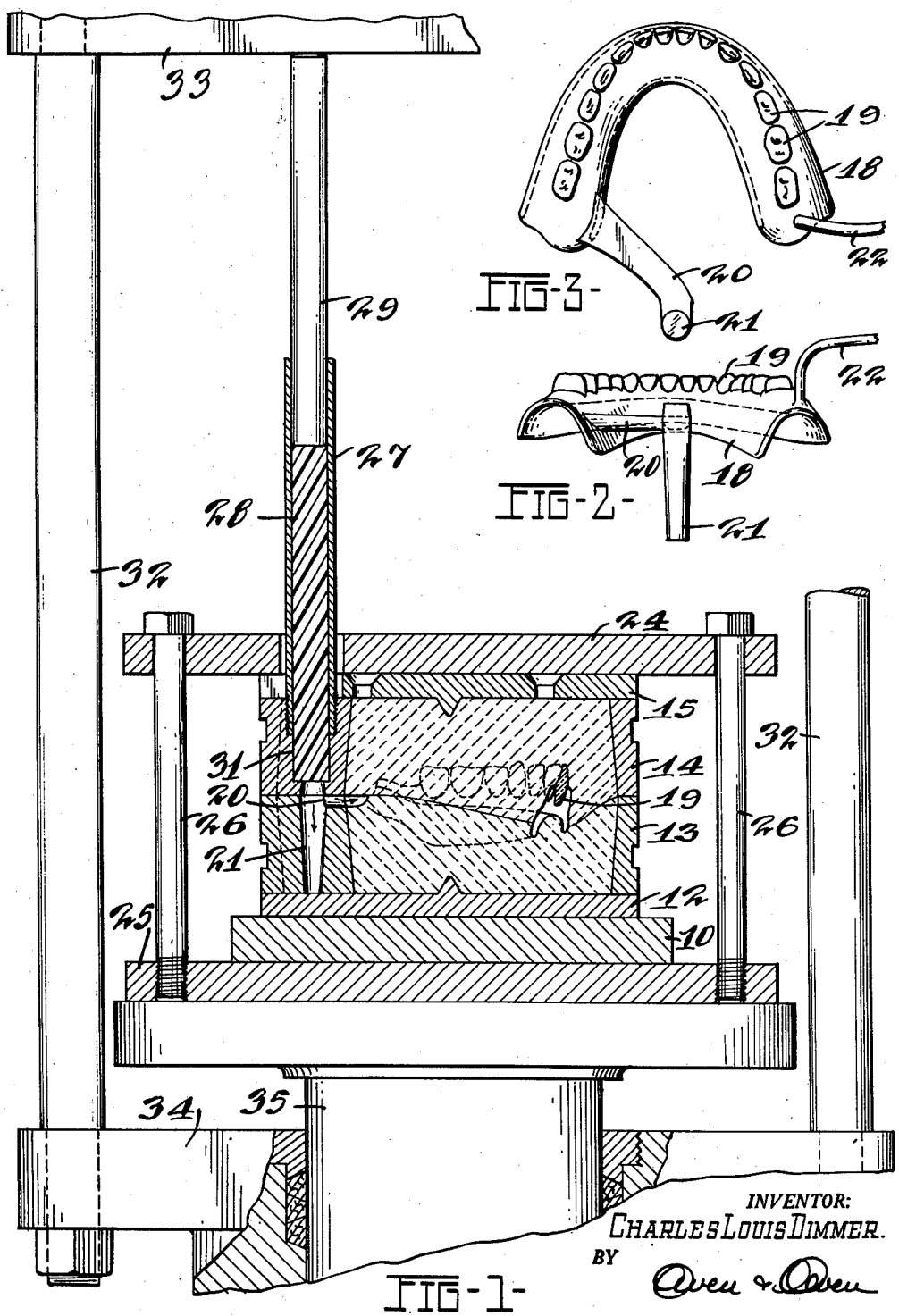
INVENTOR:
CHARLES LOUIS DIMMER.
BY
Owen & Owen
ATTYS.

May 8, 1951  C. L. DIMMER  2,551,932
INVESTMENT MATERIAL
Filed April 27, 1949  2 Sheets-Sheet 2
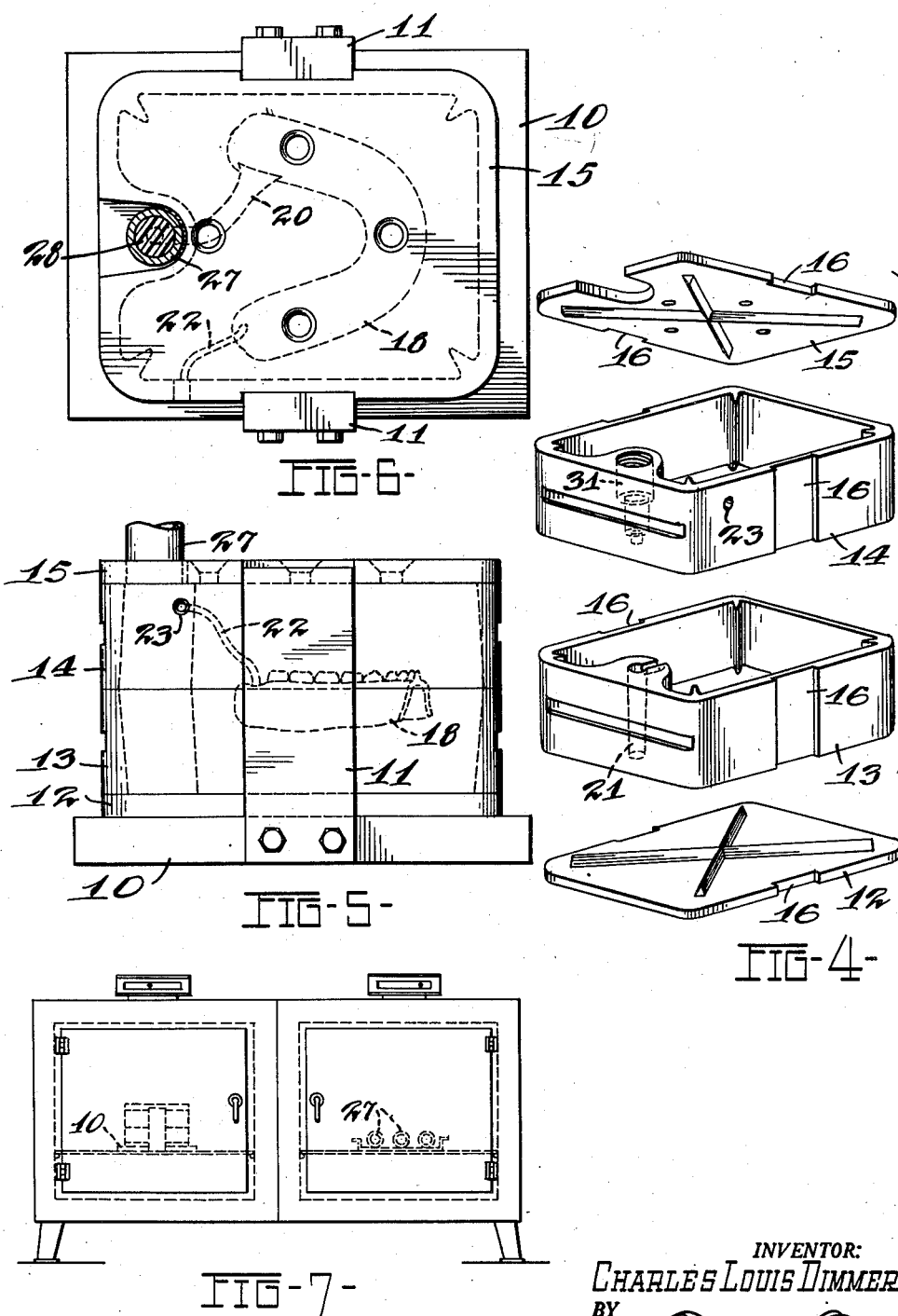
INVENTOR:
CHARLES LOUIS DIMMER.
BY
Owen & Owen
ATTYS.

Patented May 8, 1951

2,551,932

UNITED STATES PATENT OFFICE 2,551,932

INVESTMENT MATERIAL

Charles Louis Dimmer, Toledo, Ohio

Application April 27, 1949, Serial No. 89,999

3 Claims. (Cl. 18—47)

This application is a continuation in part of my former application with the same title, Serial No. 31,611, filed June 7, 1948, which has become abandoned.

This invention relates to investment material for use with injection molding in a temporary mold of articles where only one, or very few, of a given size and shape is desired. For example, in molding dentures, each is made to fit one individual mouth. For molding such articles, a permanent mold, in which a succession of exact duplicates could be formed is not necessary, and the expense would be prohibitive, and accordingly temporary molds are universally employed for molding such articles. Also, some articles are so shaped that a mold cannot be removed without breaking and destroying the mold.

Also, in testing new designs of articles, it is often desirable to make only one or at most a limited number, in order to obtain experimental data as to the operation of the proposed design in order to determine whether it will be sufficiently satisfactory to justify its manufacture in large numbers.

However, if the article is to be made from inelastic plastic, the superior qualities of injection molded plastic render it desirable to form the article by injection molding. The plastic may be thermoplastic, such as polystyrene plastic, or a thermosetting plastic. In the latter case, the polymerization is carried far enough so that the hot plastic sets promptly after being injected into the hot mold, so that it does not have to be cured in the mold for any considerable period. In either case, for best results the plastic is usually injected into the mold under a pressure of 10,000 pounds to 30,000 pounds per square inch. The difficulty is that a permanent mold for the injection molding of plastic is very expensive, and the available types of temporary molds have not been suitable for injection molding. This has constituted a severe handicap in trying out new designs for injection molded plastics, and has prevented the injection molding of individual articles such as dentures.

It has been customary in forming resin dentures to produce a temporary mold composed chiefly of dehydrated gypsum, preferably of the type known as hydrocal, and after the denture has been formed, the mold is discarded. Hydrocal is the name given gypsum that has been dehydrated in an autoclave in accordance with Patents 1,931,240 and 1,979,704. As usually formed, the gypsum mold is not strong enough to withstand usual injection pressures and the surfaces are rough in comparison with the usual metallic injection mold. Furthermore, in the usual practice of injection molding, the first few articles are imperfect until the mold becomes heated and the plastic flow becomes uniform; but with a temporary mold, only one article is made and if that is defective the process is a failure. For these various reasons, high pressure injection molding of plastic in temporary molds has not been successful.

The present invention overcomes all of the difficulties noted and makes possible the successful injection molding of plastics in temporary molds. This is accomplished by providing a new investment compound having sufficient strength and forming a mold cavity with smooth walls, and other details that will appear.

In the accompanying drawings forming a part of this specification, Fig. 1 is a side elevation of a mold and injection tube in a press, ready for the injecting operation; Figs. 2 and 3 are side and plan views, respectively, of the article to be molded; Fig. 4 is a perspective of the separated parts of the flask; Figs. 5 and 6 are a side elevation and a plan view respectively of the assembled flask; and Fig. 7 is a side elevation of an oven with the mold and injection tubes therein.

As will be seen in Fig. 5, the flask holder 10 has guide arms 11 extending upward on each side. The flask is made of four parts, as shown in Fig. 4, a bottom 12, lower side walls 13, upper side walls 14 and a top 15. Each of the parts is provided with grooves 16 fitting arms 11 and correctly aligning the flask parts.

In Figs. 2 and 3 there is shown a dental plate 18 having teeth 19 fitted therein. Extending from a portion of the plate there is a gate 20 which leads to the plate from a sprue 21.

The bottom and the lower portion of the sides of the flask may be fitted onto the flask holder, and then may be filled with a suitable investment material, and the model, shaped as shown in Fig. 2, for example, may be positioned properly therein, after which the upper portion of the sides of the flask is fitted in position and the remainder of the investment material may then be placed in the flask.

The sprue opening is formed in the metal of parts 13 and 14 and extends to the top of the flask and down past the gate to form a well for receiving the end of the entering plastic. From the part of the model most distant from the gate a member 22 on the model extends to an opening 23 in the upper half of the flask. Ordinarily the model and gate, with the exception of the teeth, are of wax.

The material of the mold is specially prepared investment material which produces a strong mold which will stand the pressure of injection molding and which has a surface approaching that of metal in smoothness. For making the mold there is employed a purified bleached gypsum that has been dehydrated in an autoclave. To the gypsum there is added from $\frac{1}{10}$ of 1% to 3% of lime which markedly increases both the strength and the smoothness of the surface. There is further added from $\frac{1}{10}$ of 1% to 5% of a lubricating material, from the group consisting of gum damar, gum arabic, and stearic acid. A small amount of inert filler, such as silica, may be used, but preferably not over 14% and none is necessary. Usual additions of 5% or less may be made to control setting time, coefficient of heat expansion, etc.

The mold thus formed constitutes a relatively strong mold for a temporary mold. It likewise is unusually smooth on its interior. When the wax of the model is melted and removed in the usual way, the teeth remain attached to the investment material sufficiently to hold them in place and in position for receiving the final plastic. The melting of the wax shown at 20 provides a properly shaped gate for receiving a comparatively large flow of plastic from the sprue opening and flattening it out into a shape which readily flows into the cavity of the mold to produce the dental plate.

In this way there is produced a relatively cheap mold which can be used without excessive expense to mold one article of a given size or shape which will have the characteristics of injection molded plastic customarily obtained by permanent molds, the cost of which is justified only when many articles are to be made from the same mold.

After the wax has been removed in the usual way, the plaster mold is then ready to receive the injected plastic. The flask is clamped in position with the plaster mold therein by connecting a top clamping plate 24 to the bottom clamping plate 25 by means of bolts 26.

While the plastic might be injected into the mold thus formed by any suitable injection mechanism, the purpose is to form only one, or at most very few, articles in the mold, and, therefore, the injection apparatus usually provided for producing a great number of articles by the injection process is not needed for the purpose of injecting in this temporary mold. Instead there is provided an injection tube 27 which recevies a stick 28 of plastic. The stick of plastic may be inserted in the injection tube and there is provided a plunger 29 which fits within the injection tube. As shown in Fig. 7, there is provided an oven 30 in which the mold may be placed, and the injection tube with a charge therein may be also placed in the same oven, but preferably in a different compartment, so as to bring the plastic in the tube to the desired temperature for injection and the mold to the desired temperature for receiving the plastic. After the mold and injection tube with the plastic therein are heated to the desired temperature, the mold may be removed from the oven and placed in a press, as indicated in Fig. 1. One end of the injection tube is then screwed into the sprue opening 31 of the member 14 and the injection plunger 29 is placed in the other end of the tube. The tube and mold then are positioned in a press of any suitable kind. In Fig. 1 there are shown connecting posts 32, which connect an abutment 33 above the tube plunger to a plate 34 below the mold. A hydraulic ram 35 is then energized and the mold and injection tube are forced upward with respect to the plunger and the plastic is injected into the sprue opening formed in the mold. Injection is continued until the plastic appearing at opening 23 shows that the mold cavity has been filled. It will be noted that the sprue opening is continued down past the position of the gate plug 20. As the plastic enters the sprue opening the end of the column of plastic, which may be cooler and less plastic than the main body of the column, due to its first contact with the sprue opening of the mold, can move past the gate opening and leave the warmer upper portion of the plastic column to spread outward through the gate and into the mold cavity. Thereafter, the mold may be opened and the molded object released in the usual way. If there are no undercuts requiring destruction of the mold in order to release the molded article, the upper and lower halves of the mold may be separated to release the article and, where desired, the mold may be re-used for producing a small number of articles of the same kind. This will not ordinarily take place in the production of dental molds of the form indicated in the drawings, but it will be readily understood that it may be desirable in forming experimental shapes to determine the suitability of the molded plastic for any particular use, and the correctness of the shaping of the plastic first tried.

In making dental plates, the teeth may be of any suitable substance, and part or all of them may be of plastic. If plastic teeth are employed, the mold will be heated only to the temperature not injurious to the teeth, and the plastic to be injected will be heated, with the injection tube, to a temperature most suitable for the injection operation. Exact control of the temperature to which the tube and plastic stick are heated is much more easily obtained by the method described than where a relatively large amount of plastic in an elaborate injection apparatus is employed.

While the specific illustration shows the molding of a dental plate, it will be understood that the same principles may be employed for molding other articles, and where it is desired to form only part of the article of plastic in the manner described, the other parts, whether formed of other material or of plastic, of the same or a different kind or color, may be preformed and positioned with wax model for the completing plastic, as are the teeth in the example shown.

The plaster mold made as described will withstand usual injection pressures of 10,000 to 30,000 pounds per square inch; but it will also withstand relatively high injection temperatures of the plastic and allow the plastic to flow into the mold so freely that lower pressures, such as 500 pounds per square inch, may be used when that will secure the desired quality of plastic in the article.

But while the described investment material remains a good mold at relatively high temperatures, especially when gum damar is used, it forms such a smooth mold surface that it is not necessary to heat the mold more than is desired. In fact, good articles have been produced by injecting plastic into such a mold with the mold at room temperature. The proper molding is facilitated greatly by the proper gate opening provided by the gate plug and by the continuance of the sprue opening past the gate so that properly plastic material will flow through the gate.

In this way there is produced a relatively cheap mold which can be used without excessive expense to mold one article of a given size or shape which will have the characteristics of injection molded plastic customarily obtained by permanent molds, the cost of which is justified only when many articles are to be made in the same mold.

While one construction of flask has been shown in considerable detail, it will be readily understood that this may be modified in desired ways, the one essential being that a flask will be produced into which suitable investment material may be placed around the model so that a plaster mold will be formed having a proper sprue opening therein and a suitable gate from the sprue opening to the mold cavity, the gate opening being preferably in the side of the sprue opening with the sprue opening extended somewhat beyond the gate. If desired, a plurality of gate openings could be connected to one sprue opening in order to mold a plurality of objects at the same time.

Ordinarily the injection tube and the plugs of plastic material to be employed therein will be cylindrical in cross-section, since that shape is the simplest and most effective. However, other shapes of the cavity within the injection tube and of the plugs for use therein might be employed for particular uses. Where the articles to be produced in the mold are approximately as similar in size as ordinary dental plates, the size of the injection tube and the length of the plastic plug may be such as to provide the required amount of plastic for the largest article to be molded so that no different sizes are required. However, if desired, the plugs of plastic may be cut off in different lengths to provide quite a wide change in the quantity of plastic to be employed for producing any particular article where various articles are to be made. If this does not provide sufficient variation in size in any particular case the diameter of the tube and of the cooperating plastic plugs may be varied to provide the proper amount of plastic.

Also by use of the tube with prepared plugs of proper size it is possible to furnish the desired amount of plastic and to force the plastic into the mold under the desired pressure without any elaborate injection mechanism. Accordingly, the difficulties in the way of injection molding of single articles, such as dental plates, and also the molding of a relatively small number of articles desired for experimental or other purposes are successfully solved by the combination of features herein set forth, and at the same time a way is provided for forming an article comprising a preformed part of any desired material and a completing part of injected plastic.

What I claim is:

1. An investment material consisting essentially of pure bleached gypsum dehydrated in an autoclave, $\frac{1}{10}$ of 1% to 3% of lime, $\frac{1}{10}$ of 1% to 5% of the group consisting of powdered gum damar and gum arabic and containing a remainder consisting of not over 14% inert filler and not over 5% of material to control setting time and expansion and contraction.

2. An investment material consisting essentially of pure bleached gypsum dehydrated in an autoclave, $\frac{1}{10}$ of 1% to 3% of lime, $\frac{1}{10}$ of 1% to 5% of powdered gum damar, and containing a remainder consisting of not over 14% inert filler and not over 5% of material to control setting time and expansion and contraction.

3. An investment material consisting essentially of bleached dehydrated gypsum as the basic ingredient, from 0.1% to 3% lime, and from 0.1% to 5% of a material of the group consisting of gum damar and gum arabic.

CHARLES LOUIS DIMMER.

REFERENCES CITED

The following references are of record in the file of this patent:

UNITED STATES PATENTS

| Number | Name | Date |
|---|---|---|
| 1,575,688 | Joannides | Mar. 9, 1926 |
| 1,588,023 | Gutteridge | June 8, 1926 |
| 1,901,054 | Dailey | Mar. 14, 1933 |
| 2,049,011 | Joannides | July 28, 1936 |
| 2,077,418 | Kelly | Apr. 20, 1937 |
| 2,371,688 | Gold | Mar. 20, 1945 |